(12) United States Patent
Daniel

(10) Patent No.: US 7,904,629 B2
(45) Date of Patent: Mar. 8, 2011

(54) VIRTUALIZED BUS DEVICE

(75) Inventor: David A. Daniel, Scottsdale, AZ (US)

(73) Assignee: NVON, Inc.

( * ) Notice: Subject to any disclaimer, the term of this patent is extended or adjusted under 35 U.S.C. 154(b) by 28 days.

(21) Appl. No.: 12/286,796

(22) Filed: Oct. 2, 2008

(65) Prior Publication Data
US 2009/0094399 A1    Apr. 9, 2009

Related U.S. Application Data

(60) Provisional application No. 60/997,348, filed on Oct. 2, 2007.

(51) Int. Cl.
  *G06F 13/36* (2006.01)
(52) U.S. Cl. .......................... 710/311; 710/312; 710/306
(58) Field of Classification Search .......... 710/306–317, 710/29, 31
  See application file for complete search history.

(56) References Cited

U.S. PATENT DOCUMENTS

| | | | |
|---|---|---|---|
| 6,016,401 A | 1/2000 | Rostoker et al. | |
| 6,044,207 A | 3/2000 | Pecone et al. | |
| 6,788,700 B1 | 9/2004 | Nakil | |
| 7,070,310 B2 * | 7/2006 | Pond et al. | 362/545 |
| 7,174,413 B2 | 2/2007 | Pettey et al. | |
| 7,293,129 B2 * | 11/2007 | Johnsen et al. | 710/313 |
| 7,610,431 B1 * | 10/2009 | Watkins et al. | 710/312 |
| 7,613,846 B2 * | 11/2009 | Dibella et al. | 710/19 |
| 7,734,859 B2 * | 6/2010 | Daniel et al. | 710/315 |
| 2003/0079075 A1 | 4/2003 | Asseline | |
| 2005/0013319 A1 | 1/2005 | Kenkare | |
| 2006/0126612 A1 * | 6/2006 | Sandy et al. | 370/389 |
| 2006/0206655 A1 * | 9/2006 | Chappell et al. | 710/315 |
| 2006/0230181 A1 * | 10/2006 | Riley | 709/239 |
| 2006/0253619 A1 * | 11/2006 | Torudbakken et al. | 710/31 |
| 2007/0005821 A1 | 1/2007 | Diamant | |
| 2007/0198763 A1 | 8/2007 | Suzuki et al. | |
| 2007/0220193 A1 * | 9/2007 | Ikeda et al. | 710/309 |
| 2008/0013569 A1 | 1/2008 | Boren | |
| 2008/0065805 A1 * | 3/2008 | Wu et al. | 710/301 |
| 2009/0077297 A1 * | 3/2009 | Zhao et al. | 710/314 |

* cited by examiner

*Primary Examiner* — Raymond N Phan
(74) *Attorney, Agent, or Firm* — Robert C. Klinger

(57) ABSTRACT

A virtualization of the internal interconnection bus, which results in a virtualized switch or virtualized multi-ported bridge. In the case of a PCI Express switch, one embodiment includes virtualization of the undefined interconnection bus. In the case of a Multi-ported bridge, one embodiment includes virtualization of the internal PCI/PCI-X bus. Through virtualization of the internal interconnection bus, the integrated circuit topology (the physical bridges and ports) may advantageously be spatially separated and remotely distributed far a field from the host computer, yet appear to the host system and host system software as single physical device (i.e. a normal PCIe switch or a normal multi-ported bridge).

26 Claims, 9 Drawing Sheets

VIRTUALIZED BUS DEVICE

CLAIM OF PRIORITY

This application claims priority of U.S. Provisional Patent Application Ser. No. 60/997,348 entitled DYNAMIC VIRTUALIZATION OF SWITCHES AND MULTI-PORTED BRIDGES, filed Oct. 2, 2007, the teachings of which are incorporated herein by reference.

CROSS REFERENCE TO RELATED APPLICATIONS

This application is related to co-pending patent application Ser. No. 12/148,712, entitled "VIRTUALIZATION OF A HOST COMPUTER'S NATIVE I/O SYSTEM ARCHITECTURE VIA THE INTERNET AND LANS", filed Apr. 21, 2008, the teachings of which are incorporated herein by reference.

FIELD OF THE INVENTION

The present invention relates to computer architecture and connectivity solutions, such as switches and multi-port bridges, such as those operable with PCI Express adapter cards.

BACKGROUND OF THE INVENTION

There is growing acceptance of techniques that leverage networked connectivity for extending and centralizing the resources of host computer systems. In particular, networked connectivity is being widely utilized for specialized applications such as attaching storage to computers. iSCSI makes use of TCP/IP as a transport for the SCSI parallel bus to enable low cost remote centralization of storage. The problem with iSCSI is it has a relatively narrow (storage) focus and capability.

Another trend is the move towards definition and virtualization of multiple computing machines within one host system. Virtualization is particularly well suited for blade server installations where the architecture is optimized for high density compute resources and pooled storage. The virtualization of CPU cycles, memory resources, storage, and network bandwidth allows for unprecedented mobility, flexibility, and adaptability of computing tasks.

PCI Express (PCIe), as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific I/O functions. A limitation of PCJ Express is that it is limited to direct attach expansion. A problem with certain blade server architectures is PCI Express is not easily accessible, thus expansion is awkward, difficult, or costly. Gbps Ethernet is beginning to give way to 10 Gbps Ethernet. This significant increase in bandwidth enables unprecedented high performance applications via IP.

SUMMARY OF INVENTION

The present invention achieves technical advantages as a virtualization of the internal interconnection bus, which results in a virtualized switch or virtualized multi-ported bridge. In the case of a PCI Express switch, one embodiment includes virtualization of the undefined interconnection bus. In the case of a Multi-ported bridge, one embodiment includes virtualization of the internal PCI/PCI-X bus. Through virtualization of the internal interconnection bus, the integrated circuit topology (the physical bridges and ports) may advantageously be spatially separated and remotely distributed far a field from the host computer, yet appear to the host system and host system software as single physical device (i.e. a normal PCIe switch or a normal multi-ported bridge).

DETAILED DESCRIPTION OF THE PRESENT INVENTION

Figure 1:
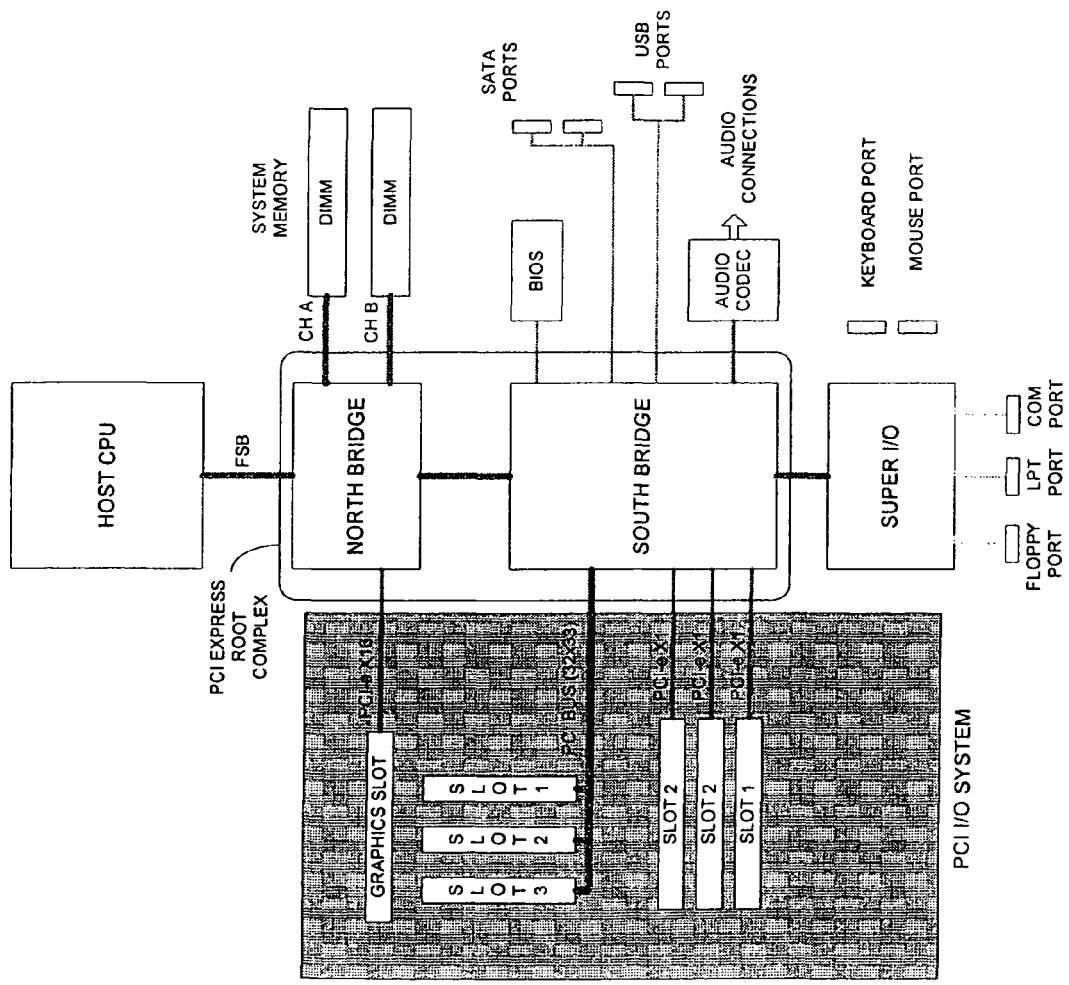
FIG. 1 depicts a PCI I/O System of a typical host.

Applicant's commonly assigned U.S. patent application Ser. No. 12/148,712 entitled "Virtualization of a host computer's native I/O system architecture via the Internet and LANs" teaches and describes a hardware/software system that collectively enables virtualization of the host computer's native I/O system architecture via the Internet and LANs. This invention allows devices native to the host computer native I/O system architecture—including bridges, I/O controllers, and a large variety of general purpose and specialty I/O cards—to be located far a field from the host computer, yet appear to the host system and host system software as native system memory or I/O address mapped resources. The end result is a host computer system with unprecedented reach and flexibility through utilization of LANs and the Internet. A preferred embodiment, designated "i-PCI", involves extending the PCI I/O System Architecture of a host. The PCI I/O System of a typical host is shown highlighted in FIG. 1.

One core embodiment extends the PCI I/O System via encapsulation of PCI Express packets within TCP/IP and/or Ethernet packets and then utilize the Internet or LAN as a transport. The network is made transparent to the host and thus the remote I/O appears to the host system as an integral part of the local PCI System Architecture. The result is a "virtualization" of the host PCI System.

Figure 2:
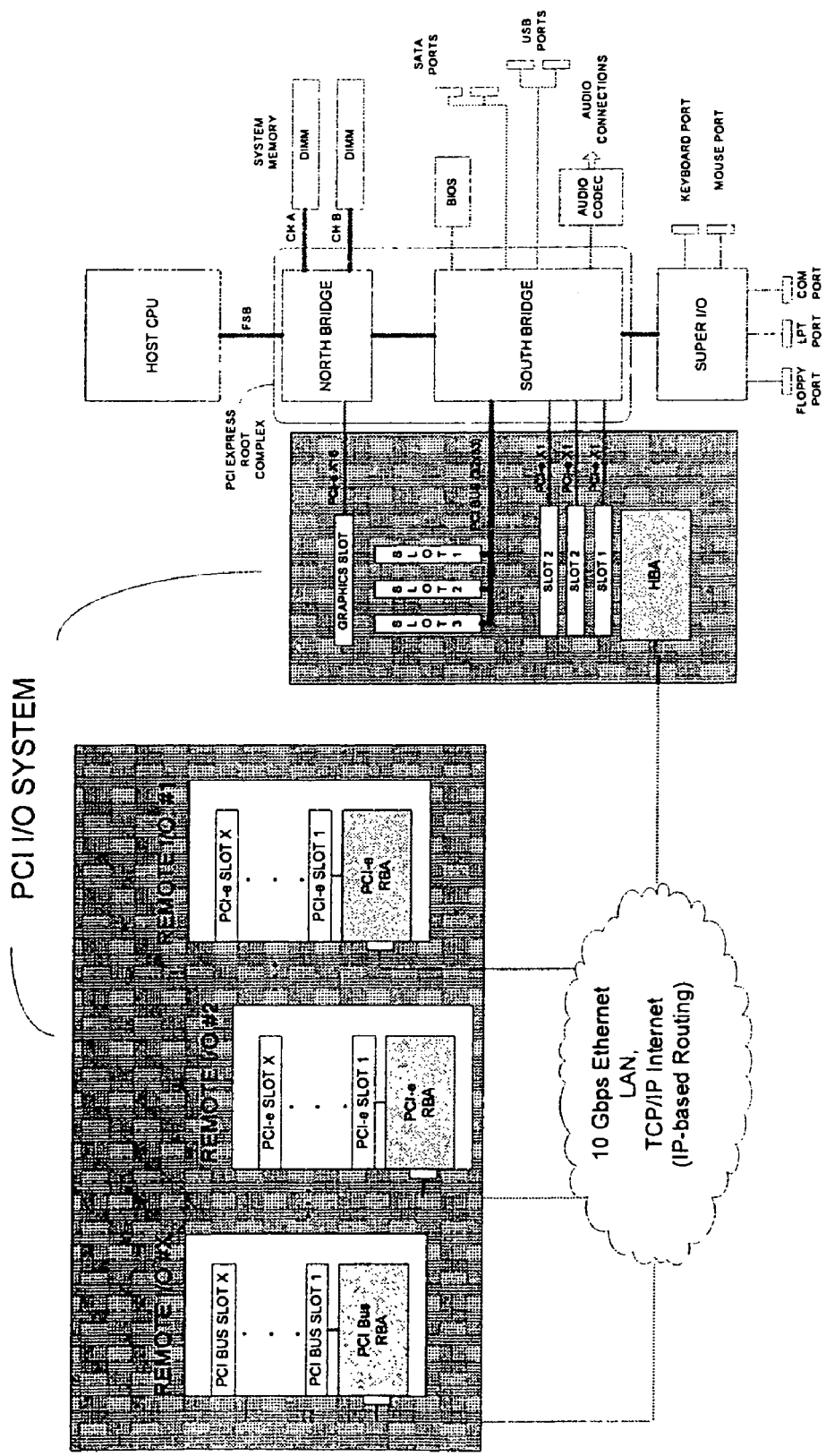
FIG. 2 depicts a host system connected to multiple remote I/O chassis.

FIG. 2 shows a host system connected to multiple remote I/O chassis. A Host Bus Adapter (HBA) installed in a host PCI Express slot interfaces the host to the Internet or LAN. A Remote Bus Adapter (RBA) interfaces the remote PCI Express bus resources to the LAN or Internet.

PCI Express as a point-to-point technology utilizes switches to interconnect devices within the PCI I/O System. A switch is an integrated circuit consisting of two more internally interconnected virtual PCI-to-PCI bridges. The internal interconnection bus is a non-defined bus, but is enumerated by the PCI system software and appears to the host as if it were a regular numbered PCI bus. Each bridge includes a PCI Express port on its external interface. One port of a switch is oriented "upstream" towards the Root Complex and the rest of the ports are oriented "downstream" away from the Root-complex.

Figure 3:
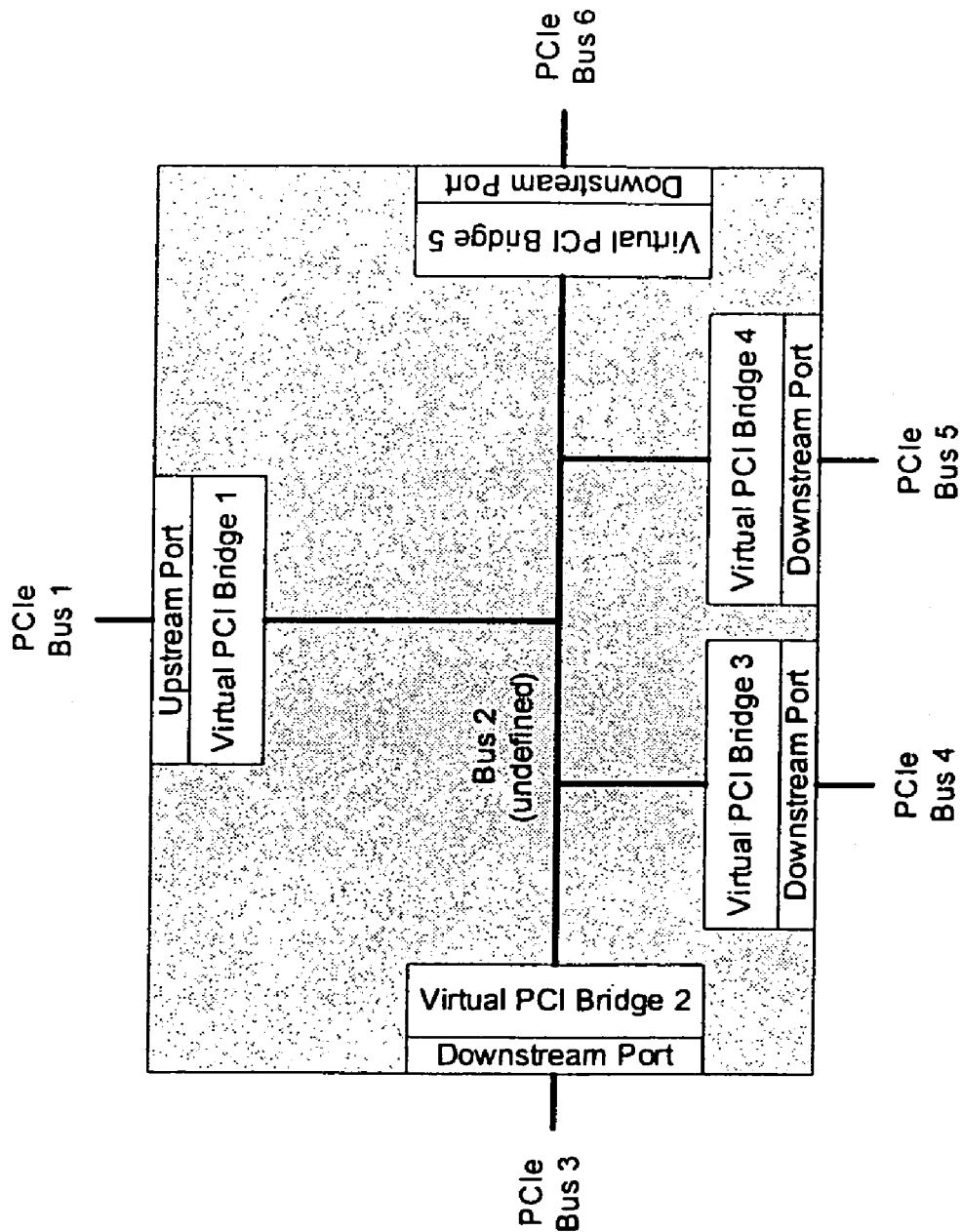
FIG. 3 is an Example PCI Express Switch Block Diagram that provides a simplified illustration of a 5-port switch.

FIG. 3 is an Example PCI Express Switch Block Diagram that provides a simplified illustration of a 5-port switch.

The upstream port (Port 1 in FIG. 3) Capability register (not shown) is set to "0101b" to indicate to the PCI system software that it is an upstream port of a PCI Express switch. The downstream ports (Ports 2,3,4,5 in FIG. 3) Capability registers (not shown) are set to "0110b" to indicate to the PCI system software that each is a downstream port.

PCI Express Architecture also includes the concept of a multi-ported bridge. A multi-ported bridge is an integrated circuit consisting of an upstream PCI Express to PCI/PCI-X Bridge and two or more internally interconnected downstream PCI-to-PCI bridges for interfacing to external conventional PCI/PCI-X buses. The internal interconnection between the bridges is a virtual PCI/PCI-X Bus.

Figure 4:
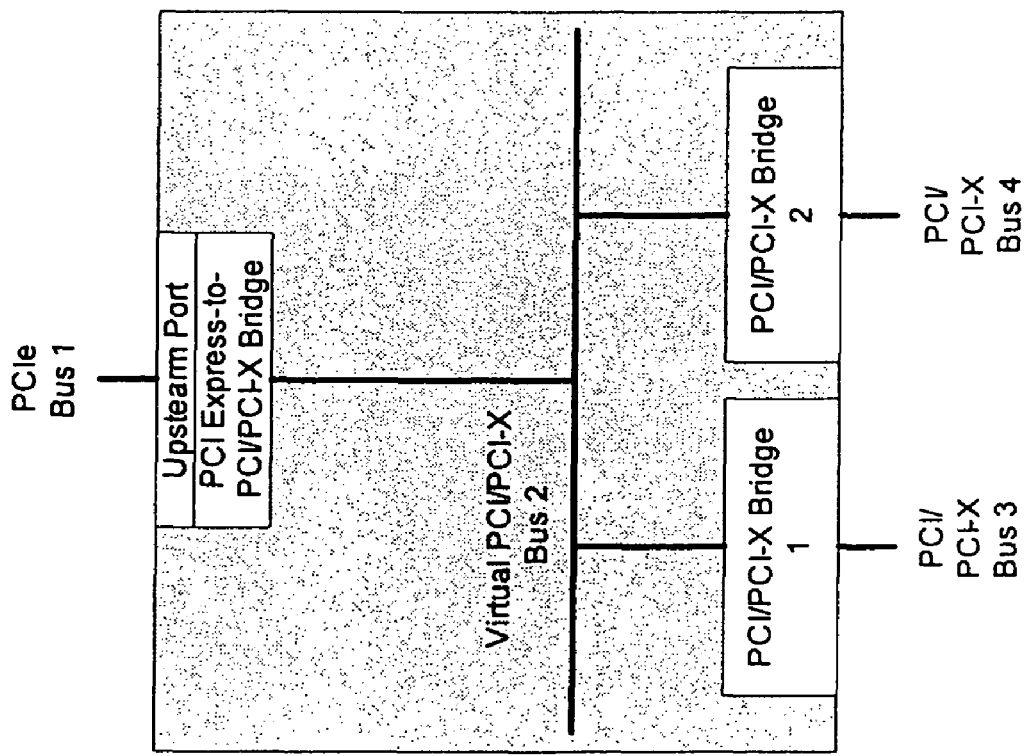
FIG. 4 shows an Example Multiported Bridge Block Diagram that provides a simplified illustration of a 3-bridge multi-port bridge.

FIG. 4 shows an Example Multiported Bridge Block Diagram that provides a simplified illustration of a 3-bridge multi-port bridge.

Figure 5:
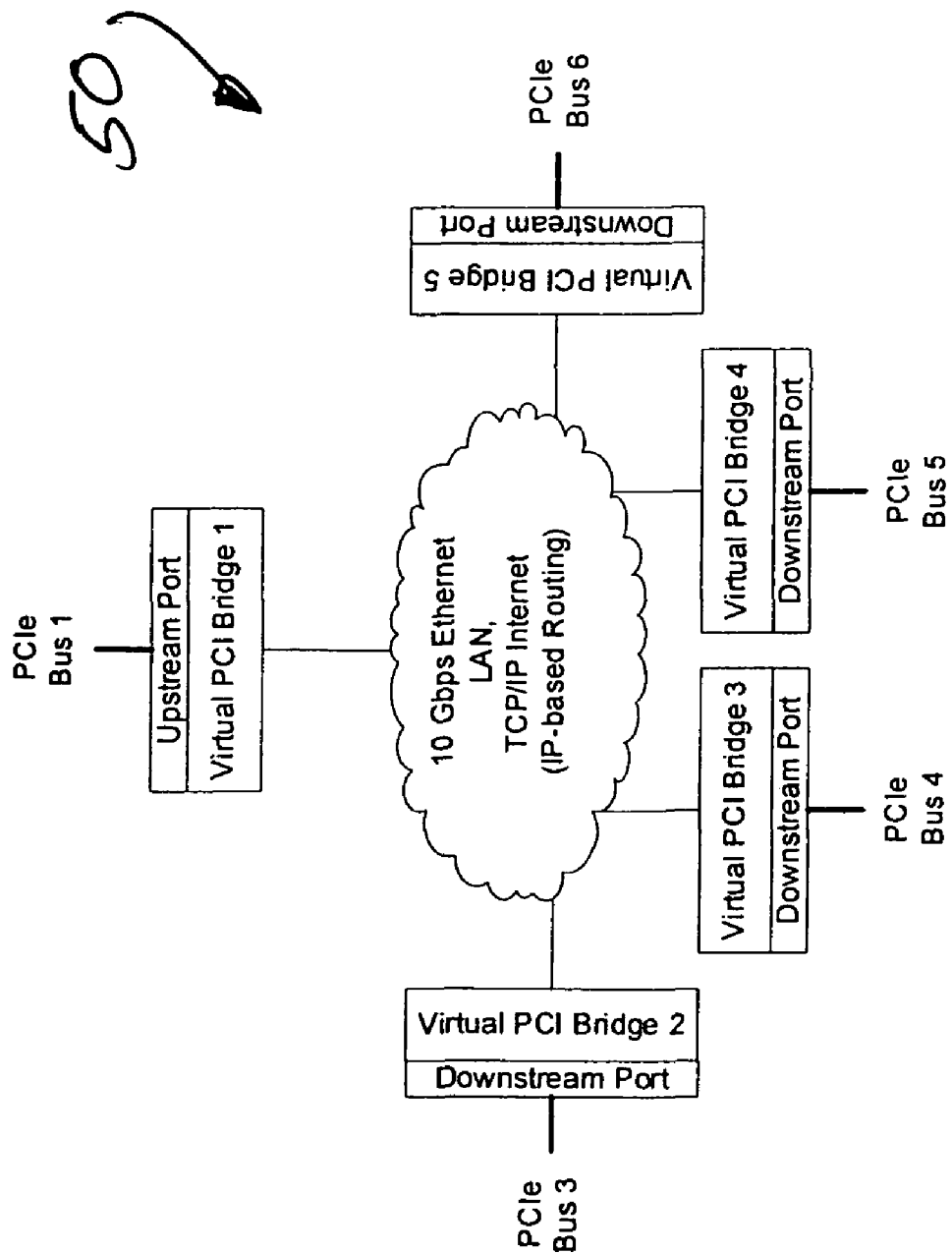
FIG. 5 depicts a Virtualized PCI Express Switch according to one embodiment of the invention.
Figure 6:
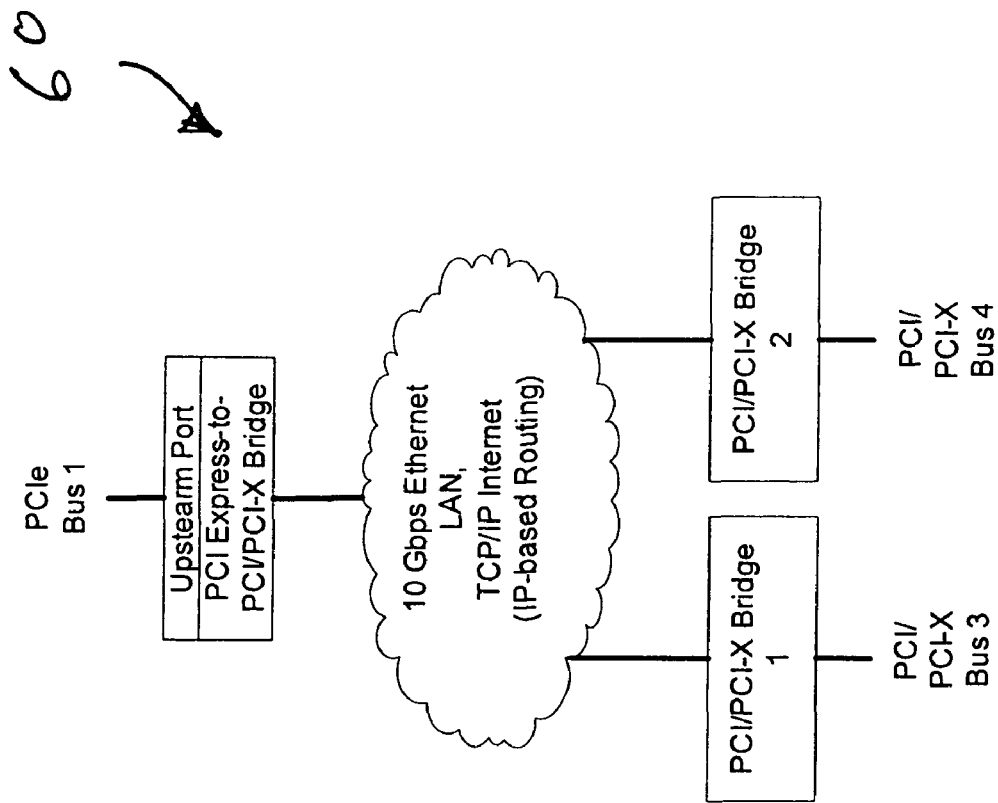
FIG. 6 shows a Virtualized Multi-ported Bridge according to another preferred embodiment.

Referring now to FIG. 5, a Virtualized PCI Express Switch is shown at 50 according to one preferred embodiment of the invention. FIG. 6 shows a Virtualized Multi-ported Bridge at 60 according to another preferred embodiment of the invention.

The upstream PCI Express to PCI/PCI-X Bridge Capability register (not shown) is set to "0111b" to indicate to the PCI system software that it is a PCI Express to PCI/PCI-X Bridge. The downstream stream PCI-to-PCI bridges are configured as conventional PCI bridges.

One embodiment of the invention is to encapsulate the PCI Express packets routing between the switch (or multi-port) bridges within TCP/IP and/or Ethernet packets, and then utilize the Internet or LAN as a transport. This encapsulation of PCI Express packets may be done according to Applicant's cross-referenced application, the teachings of which are incorporated herein by reference. The network is transparent to the host and thus the switch or multiport bridge interconnected not by an internal bus, but by a network—and appears to the host system as a normal device. The result is a "virtualization" of the switch or multi-ported bridge. This cross referenced application teaches and describes a hardware/software system that collectively enables this virtualization of the host computer's native I/O system architecture via the Internet and LANs. The same basic techniques described in that application can be applied to the internal architecture of an PCI Express integrated circuit to enable a virtualized version of the device and allow functional separation of the device functions and external interfaces. Although this invention specifically addresses the virtualization of PCIe switches and multi-port bridges, these teachings are applicable to the virtualization of any PCIe device that implements an internal enumerated bus that interfaces to multiple PCIe functions.

Figure 7:
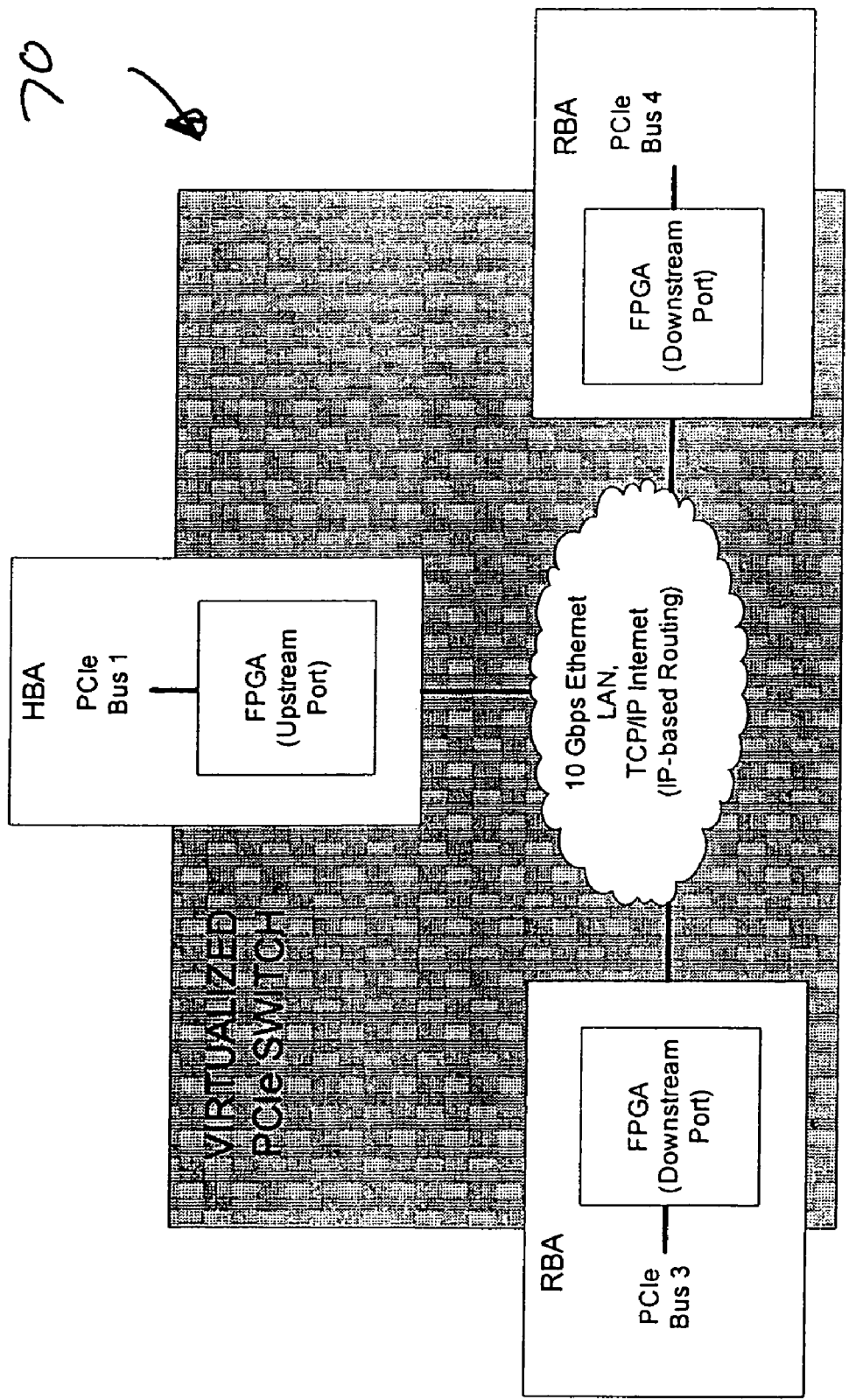
FIG. 7 depicts a virtualized PCIe switch.

Each bridge or port of a virtualized device can be located physically separate. In one embodiment, the PCIe bridges and ports may be implemented in separate programmable logic devices such as FPGAs. A Host Bus Adapter (HBA) installed in a host PCI Express may include an FPGA onboard, implementing the upstream port. Remote Bus Adapters (RBAs) located at up to 32 separate Remote I/O chassis may include an FPGA onboard with each of them implementing a downstream port. These FPGAs can then be interconnected via the Internet. The net result is a virtualized PCIe switch shown in FIG. 7 at 70.

The virtualized PCIe switch is a key building block for facilitating deployment of i-PCI. As a result of virtualization, the number of ports for a PCI Express Switch is no longer fixed. The switch or multiported bridge is no longer restricted to a fixed capability due to physical limitations. The network separation allows ports to be dynamically added to (or removed from) the architecture as necessary or desired. PCI Express allows up to 32 devices per link, thus it is possible to dynamically configure a switch or multiport bridge for anywhere from 2 to 32 bridges distributed across a network.

Figure 8:
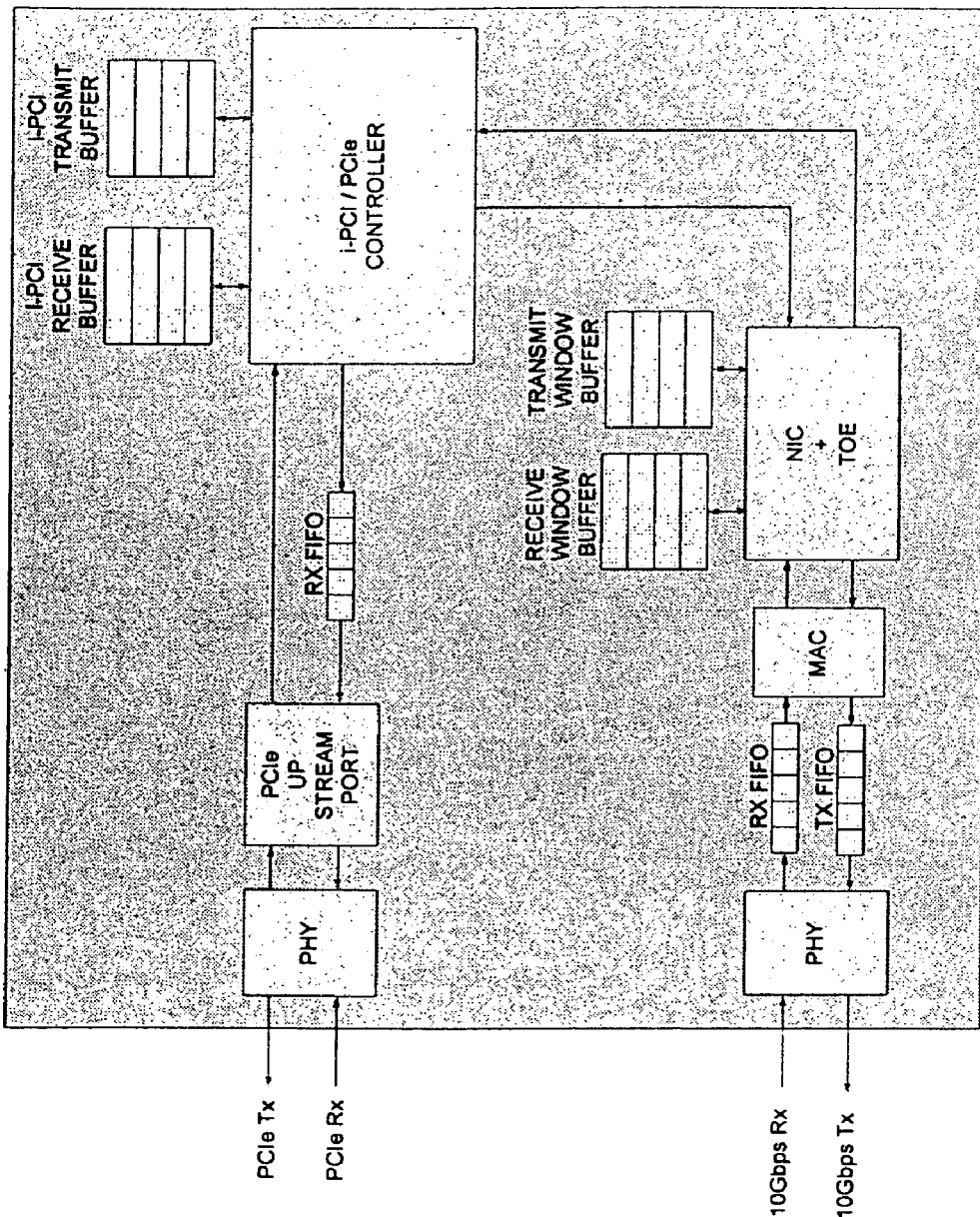
FIG. 8 depicts a FPGA design.

The FPGA design shown at 80 in FIG. 8 is applicable to a Host Bus adapter. It contains the PCIe Upstream Port and associated Rx FIFO and PHY; i-PCI/PCI-e Controller and associated Transmit and Receive buffers; 10 Gbps NIC Controller+TCP/IP Offload engine and associated buffers, FIFOs, MAC, and PHY.

Figure 9:
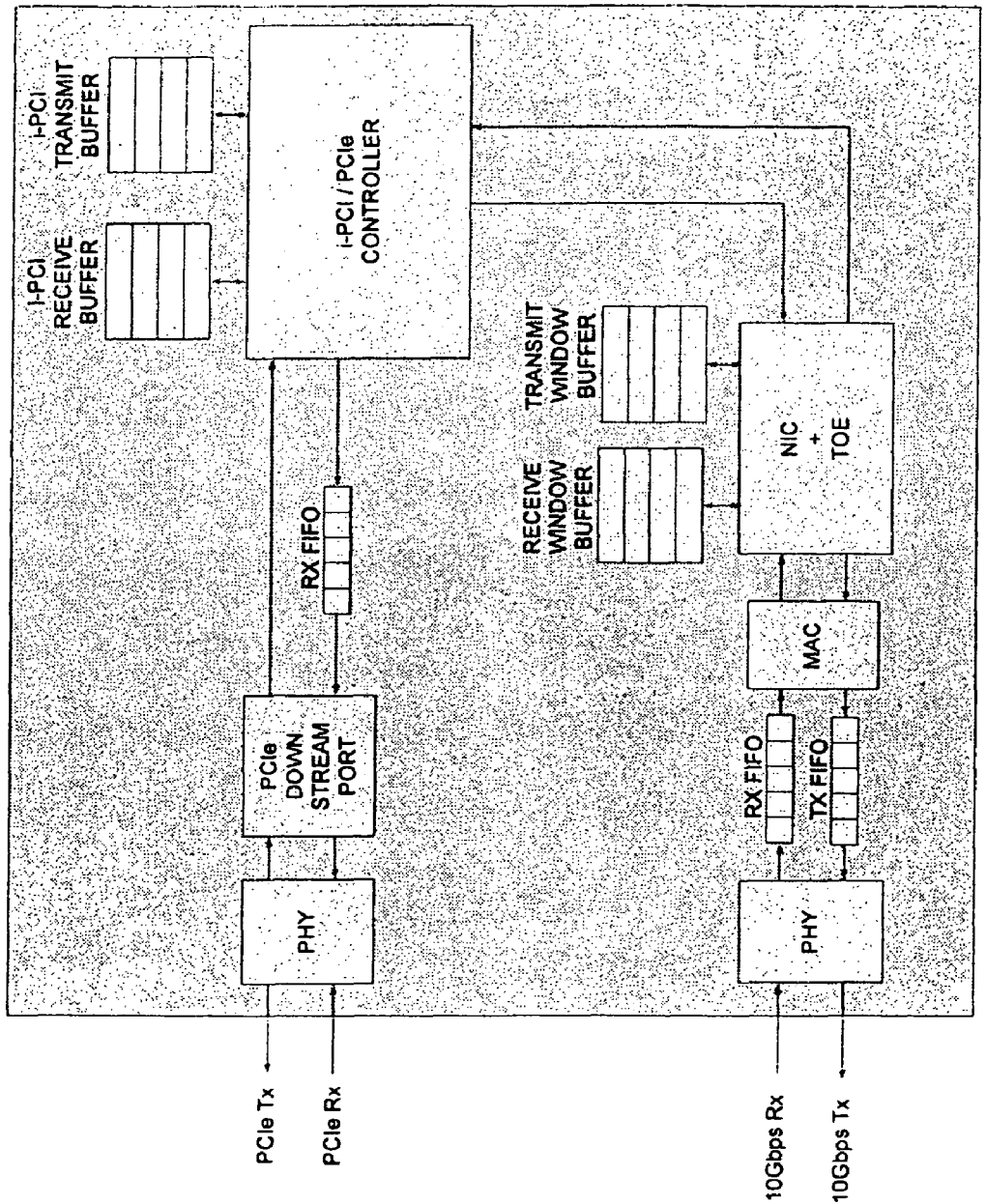
FIG. 9 depicts a FPGA design.

The FPGA design shown at 90 in FIG. 9 is applicable to a Remote Bus Adapter shown in FIG. 9 contains the PCIe Downstream Port and associated Rx FIFO and PHY; i-PCI/PCI-e Controller and associated Transmit and Receive buffers; 10 Gbps NIC Controller+TCP/IP Offload engine and associated buffers, FIFOs, MAC, and PHY.

The i-PCI/PCIe Controller implements logic that enables the invention. Logic processes the PCI Express packets that originate and terminate at the transaction layer. Packets are encapsulated and unencapsulated for transfer across the network. Logic within the controller processes the local PCI Express packets that originate and terminate at the data link layer and performs the appropriate actions as defined by the PCI Express specification. Data buffering and queuing necessary to bridge between local PCI Express links and TCP/IP or Thernet is implemented.

A problem with virtualization of the PCIe switch or PCI Multi-ported bridge is it introduces additional latency. This introduced latency can create conditions that result in assorted timeout conditions. Logic in the i-PCI/PCIe Controller accomplishes any configuration and extra synchronization required between the physically separated upstream and downstream ports. The i-PCI/PCIe Controller implements Adaptable Resource Spoofing" (ARS) to mitigate latency. Adaptable resource spoofing is defined as the local mimicking of remote computer resources (in this case remote port configuration information) to optimize the system Quality of Service (QOS) and mitigate system timeout mechanisms.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A virtualized bus device, comprising:
    an upstream bridge and an associated port configured to interface with a computer processor adapted to generate data packets;
    at least one downstream bridge spatially remote from and operable with the upstream bridge; and
    an interface configured to encapsulate the data packets, and transport the encapsulated data packets via a network between the bridges;
    wherein the virtualized bus device is configured as a virtualized multi-ported bridge, and wherein there is a dynamic number of the downstream bridges.

2. A virtualized bus device, comprising:
an upstream bridge and an associated port configured to interface with a computer processor adapted to generate data packets;
at least one downstream bridge spatially remote from and operable with the upstream bridge; and
an interface configured to encapsulate the data packets, and transport the encapsulated data packets via a network between the bridges;
wherein the virtualized bus device is configured as a virtualized multi-ported bridge, and
wherein the number of downstream bridges is programmable.

3. A virtualized bus device, comprising:
an upstream bridge and an associated port configured to interface with a computer processor adapted to generate data packets;
at least one downstream bridge spatially remote from and operable with the upstream bridge; and
an interface configured to encapsulate the data packets, and transport the encapsulated data packets via a network between the bridges;
wherein the virtualized bus device is configured as a virtualized multi-ported bridge, and
wherein the locations of the downstream bridges are programmable.

4. A virtualized bus device, comprising:
an upstream bridge and an associated port configured to interface with a computer processor adapted to generate data packets;
at least one downstream bridge spatially remote from and operable with the upstream bridge; and an interface configured to encapsulate the data packets, and transport the encapsulated data packets via a network between the bridges;
wherein the virtualized bus device is configured as a virtualized switch, and
wherein the virtualized switch has a dynamic number of downstream bridges and associated downstream ports.

5. A virtualized bus device, comprising:
an upstream bridge and an associated port configured to interface with a computer processor adapted to generate data packets;
at least one downstream bridge spatially remote from and operable with the upstream bridge; and
an interface configured to encapsulate the data packets, and transport the encapsulated data packets via a network between the bridges;
wherein the virtualized bus device is configured as a virtualized switch, and
wherein the number of downstream bridges and associated downstream ports is programmable.

6. A virtualized bus device, comprising:
an upstream bridge and an associated port configured to interface with a computer processor adapted to generate data packets;
at least one downstream bridge spatially remote from and operable with the upstream bridge; and
an interface configured to encapsulate the data packets, and transport the encapsulated data packets via a network between the bridges;
wherein the virtualized bus device is configured as a virtualized switch, and
wherein the locations of the downstream bridges and associated downstream ports are programmable.

7. A virtualized bus device, comprising:
an upstream bridge and an associated port configured to interface with a computer processor adapted to generate data packets;
at least one downstream bridge spatially remote from and operable with the upstream bridge; and an interface configured to encapsulate the data packets, and transport the encapsulated data packets via a network between the bridges,
wherein the network is based on the Internet Protocol (IP).

8. The virtualized bus device as specified in claim 7 wherein the device is configured to operate without necessitating the utilization of another network element to transport the encapsulated data packets via the network.

9. A virtualized bus device, comprising:
an upstream bridge and an associated port configured to interface with a computer processor adapted to generate data packets;
at least one downstream bridge spatially remote from and operable with the upstream bridge; and an interface configured to encapsulate the data packets, and transport the encapsulated data packets via a network between the bridges,
wherein the network implements TCP/IP.

10. The virtualized bus device as specified in claim 9 wherein the device is configured to operate without necessitating the utilization of another network element to transport the encapsulated data packets via the network.

11. A virtualized bus device, comprising:
an upstream bridge and an associated port configured to interface with a computer processor adapted to generate data packets;
at least one downstream bridge spatially remote from and operable with the upstream bridge; and
an interface configured to encapsulate the data packets, and transport the encapsulated data packets via a network between the bridges, wherein the network is a wireless protocol.

12. The virtualized bus device as specified in claim 11 wherein the device is configured to operate without necessitating the utilization of another network element to transport the encapsulated data packets via the network.

13. A virtualized bus device, comprising:
an upstream bridge and an associated port configured to interface with a computer processor adapted to generate data packets;
at least one downstream bridge spatially remote from and operable with the upstream bridge; and
an interface configured to encapsulate the data packets, and transport the encapsulated data packets via a network between the bridges;
wherein the network between the bridges is selected from the group consisting of: direct connect, wide area network (WAN), and wireless transport.

14. The virtualized bus device as specified in claim 13 wherein the virtualized bus device includes a downstream endpoint implementing one or more functions.

15. The virtualized bus device as specified in claim 13 wherein the virtualized bus device is configured as a multi-function device that includes any allowable quantity and combination of bridges, ports, and downstream endpoints implementing any allowable quantity of functions.

16. The virtualized bus device as specified in claim 13 wherein the virtualized bus device comprises a PCIe device.

17. The virtualized bus device as specified in claim 13 wherein the virtualized bus device is a realization of and representative of an actual bus device.

18. The virtualized bus device as specified in claim 13 wherein there is a dynamic number of the downstream bridges.

19. The virtualized bus device as specified in claim 13 wherein the number of downstream bridges is programmable.

20. The virtualized bus device as specified in claim 13 wherein the locations of the downstream bridges are programmable.

21. The virtualized bus device as specified in claim 13 wherein the network is based on the Internet Protocol (IP).

22. The virtualized bus device as specified in claim 13 wherein the network implements TCP/IP.

23. The virtualized bus device as specified in claim 13 wherein the network is a wireless protocol.

24. The virtualized bus device as specified in claim 13 wherein the network between the bridges includes an i-PCI protocol.

25. The virtualized bus device as specified in claim 13 wherein the downstream bridge is spatially remote from the upstream bridge a distance greater than that allowed by a local I/O bus technology.

26. The virtualized bus device as specified in claim 13 wherein the device is configured to operate without necessitating the utilization of another network element to transport the encapsulated data packets via the network.

* * * * *